UNITED STATES PATENT OFFICE.

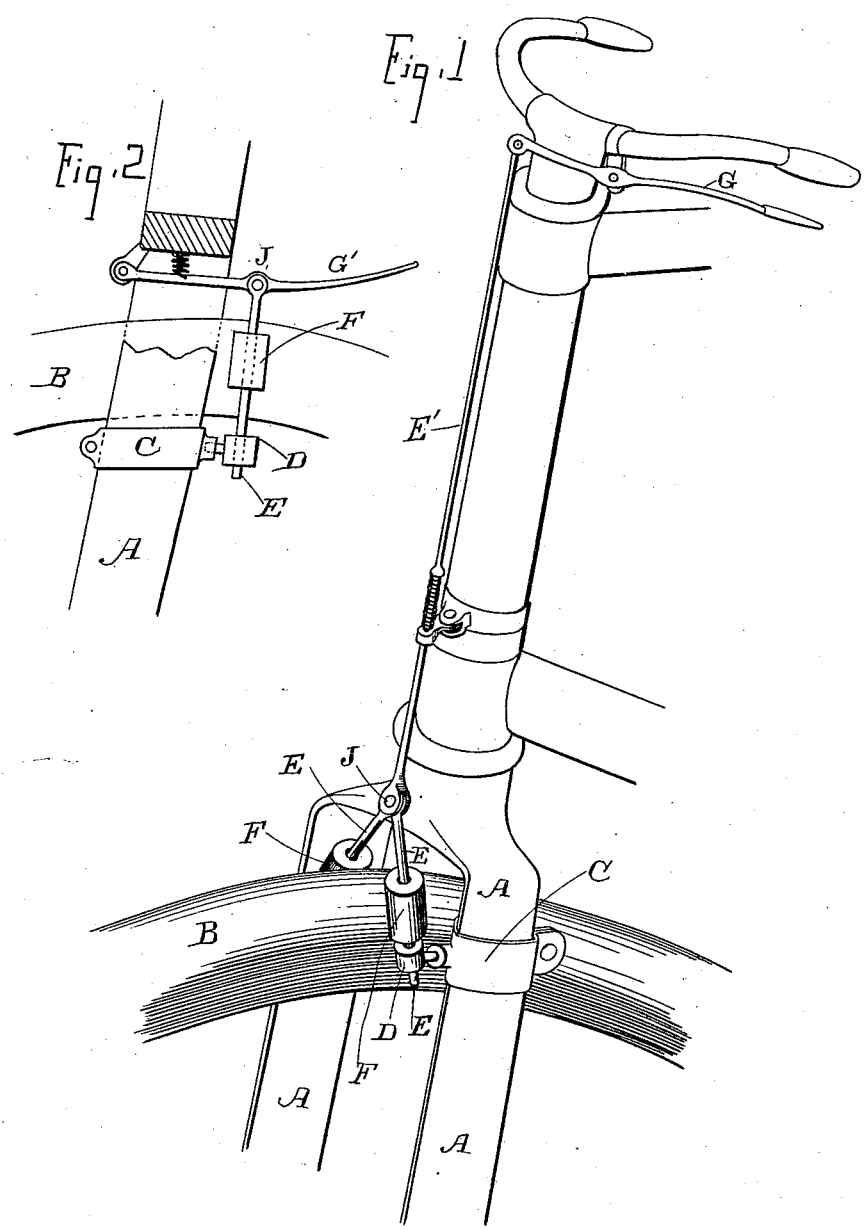

JORGEN CHRISTENSEN, OF SAN FRANCISCO, CALIFORNIA.

BICYCLE-BRAKE.

SPECIFICATION forming part of Letters Patent No. 543,723, dated July 30, 1895.

Application filed March 6, 1895. Serial No. 540,748. (No model.)

*To all whom it may concern:*

Be it known that I, JORGEN CHRISTENSEN, a citizen of the United States, residing in the city and county of San Francisco, State of California, have invented an Improvement in Bicycle-Brakes; and I hereby declare the following to be a full, clear, and exact description of the same.

My invention relates to an improved brake for bicycles.

It consists in certain details of construction, which will be more fully explained by reference to the accompanying drawings, in which—

Figure 1 is a view showing the application of my device to a bicycle with a hand-lever. Fig. 2 shows its operation with a foot-lever.

The object of my invention is to provide a brake which is easily applicable, and is especially adapted for use upon the pneumatic tires or the rims of bicycles to produce a sufficient frictional and retarding effect without unnecessary wear of the substance of the tire.

In carrying out my invention I employ rollers, which may be made of any suitable material—such as rubber, gutta-percha, or other substance—and these rollers are mounted upon each side of the wheel rim or tire to which the brake is to be applied with a mechanism hereinafter described by which they are forced into contact with opposite sides of the rim or tire or disengaged therefrom.

This brake may be applied to either the front or rear wheel, as may be desired. In the present case I have shown it as applied to the front wheel.

A A are the forks or framework between which the wheel B revolves. Upon each of these forks is fixed a clamp or support C, and swiveling-stems project from these supports with sockets or sleeves D, through which the shafts E are slidable. These shafts, upon which the rollers F are loosely mounted, are connected at the upper end with a rod or bar E′, the upper end of which is connected with the brake-lever G, which is fulcrumed upon or adjacent to the handle-bars, so as to be grasped by the hand of the rider when it is desired to apply the brake. The device may also be so mounted as to be operated by a foot-lever G′, Fig. 2. The shafts E are slidable through the sleeves D, and as they converge to their point of junction with the rod E it will be seen that when the rod is pressed down the shafts will slide through the oscillating sleeves D, and as the upper ends approach the periphery of the wheel the rollers F will be drawn toward each other by the change in the meeting angle of the shafts E.

When the brake is to be applied, by pressing upon the lever G the rod E′ is forced toward the wheel, and the shafts E, sliding through the sleeves D, the triangular space between the shafts E is made smaller, and the rollers F are thus forced against the rim or tire of the wheel upon each side with any desired degree of pressure. This triangular arrangement of the shafts E and their connection at J, together with the rocking sleeves D, through which they are slidable, produces a powerful compound lever which, with a small amount of pressure upon the brake-lever, will compress the rollers against the rim or tire of the wheel with any desired degree of force, while the rollers turning upon the shafts will roll upon the tire, and thus prevent any grinding or wearing friction thereon.

Any suitable form of returning-spring may be employed to instantly withdraw the shafts E and separate the rollers whenever the pressure upon the brake-lever has been released.

Having thus described my invention, what I claim as new, and desire to secure by Letters Patent, is—

1. In a brake for vehicles, rollers turning upon diverging shafts, the meeting angles of which are connected with an arm or lever by which they are reciprocated, rocking blocks or sleeves through which the separated ends of the roller shafts pass and are slidable, whereby the rollers are caused to approach each other and press upon each side of the wheel rim or tire when the shafts are forced through the oscillating sleeves, and are separated therefrom when the shafts are withdrawn.

2. A brake for vehicles consisting of diverging shafts upon each side of the wheel rim or tire, oscillating blocks through which the separated ends of the shafts are slidable, a jointed connection to which the meeting ends of the shafts are united whereby the angle of the shafts to each other is increased or diminished by moving the meeting ends of the shafts in a line intermediate between the two, a lever connection by which said shafts are thus moved, and rollers journaled to turn loosely upon said shafts upon each side of a wheel rim or tire, against each side of which they are forced when the meeting ends of the shafts are moved toward the wheel rim and withdrawn therefrom by the withdrawal of the shafts.

3. In a brake for vehicles, the combination, of revoluble rollers upon shafts which converge upon opposite sides of the wheels, said shafts being flexibly united at their upper ends, and having their lower ends loosely mounted and adapted to rock whereby they may be moved in lateral planes to and from the wheel rim to apply or remove the brake, and means connected with the jointed ends of the shafts for tilting said shafts.

In witness whereof I have hereunto set my hand.

JORGEN CHRISTENSEN.

Witnesses:
S. H. NOURSE,
JESSIE C. BRODIE.